US010175953B2

(12) United States Patent
Olenick et al.

(10) Patent No.: US 10,175,953 B2
(45) Date of Patent: Jan. 8, 2019

(54) USER INTERFACE CONTROL AND COMMUNICATION

(71) Applicant: Microsoft Technology Licensing, LLC, Redmond, WA (US)

(72) Inventors: Brad Olenick, Redmond, WA (US); Alaa Shaker, Bellevue, WA (US); Leon Ezequiel Welicki, Issaquah, WA (US); Alvaro Rahul Dias, Bellevue, WA (US); Syed Nadir Ahmed, Redmond, WA (US); Mo Wang, Seattle, WA (US); Ryan A. Jansen, Kirkland, WA (US); Mark D. Overholt, Redmond, WA (US); Prabir Krishna Shrestha, Bellevue, WA (US); Amin Bagheri, Seattle, WA (US); Zhao Yu, Redmond, WA (US); Julio O. Casal Terreros, Redmond, WA (US); Dasaradha Ramu Yalamanchili, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1020 days.

(21) Appl. No.: 14/306,095

(22) Filed: Jun. 16, 2014

(65) Prior Publication Data
US 2015/0288747 A1 Oct. 8, 2015

Related U.S. Application Data

(60) Provisional application No. 61/974,185, filed on Apr. 2, 2014.

(51) Int. Cl.
*G06F 9/44* (2018.01)
*G06F 9/451* (2018.01)
(Continued)

(52) U.S. Cl.
CPC ............... *G06F 8/34* (2013.01); *G06F 8/35* (2013.01); *G06F 8/38* (2013.01); *G06F 9/451* (2018.02);
(Continued)

(58) Field of Classification Search
CPC . H04L 67/10; H04L 67/42; G06F 9/54; G06F 9/4443; G06F 8/38; G06F 8/36;
(Continued)

(56) References Cited

U.S. PATENT DOCUMENTS 6,785,812 B1    8/2004 Botham et al.
7,155,681 B2   12/2006 Mansour et al.
(Continued)

FOREIGN PATENT DOCUMENTS

EP    0777178 A1    6/1997

OTHER PUBLICATIONS

"Second Written Opinion Issued in PCT Application No. PCT/US2015/023447", dated Mar. 15, 2016, 6 Pages.
(Continued)

*Primary Examiner* — Nicholas Ulrich
(74) *Attorney, Agent, or Firm* — Workman Nydegger

(57) ABSTRACT

A user interface control that has different logic components for processing different role logic depending on a role that is played by the user interface control. The user interface control may also have a general function component that performs general functions that may be common across multiple user interface controls. Also, a protocol for use in communicating between two user interface controls to establish a communications link. A first user interface control requests information from a second user interface control, which then obtains the requested information. The second user interface control then provides the requested informa-
(Continued)

tion to the first user interface control, and then awaits the validation of the requested information.

20 Claims, 6 Drawing Sheets

(51) Int. Cl.
| | |
|---|---|
| *G06F 8/38* | (2018.01) |
| *G06F 9/54* | (2006.01) |
| *G06F 8/34* | (2018.01) |
| *G06F 8/35* | (2018.01) |
| *H04L 29/08* | (2006.01) |
| *H04L 29/06* | (2006.01) |

(52) U.S. Cl.
CPC ............... *G06F 9/54* (2013.01); *H04L 67/10* (2013.01); *H04L 67/42* (2013.01)

(58) Field of Classification Search
CPC ..... G06F 8/34; G06F 8/24; G06F 8/30; G06F 8/35; G06F 9/4494; Y10S 715/967; Y10S 715/965; G05B 2219/23008
USPC ........................................................ 715/762
See application file for complete search history.

(56) References Cited

U.S. PATENT DOCUMENTS

| | | | | |
|---|---|---|---|---|
| 7,234,158 | B1 | 6/2007 | Guo et al. | |
| 7,949,774 | B2 | 5/2011 | Kime et al. | |
| 8,627,208 | B2* | 1/2014 | Rivas ................ | G06F 17/30436 |
| | | | | 715/744 |
| 8,646,026 | B2 | 2/2014 | Chang | |
| 8,726,230 | B1* | 5/2014 | Wen .......................... | G06F 8/38 |
| | | | | 715/762 |
| 8,966,438 | B2* | 2/2015 | Chamberlain ............ | G06F 8/34 |
| | | | | 705/37 |
| 2002/0070965 | A1 | 6/2002 | Austin | |
| 2002/0116225 | A1 | 8/2002 | Morse et al. | |
| 2003/0043192 | A1* | 3/2003 | Bouleau ................ | G06F 9/4443 |
| | | | | 715/762 |
| 2006/0015755 | A1 | 1/2006 | Jaffe | |
| 2006/0236254 | A1* | 10/2006 | Mateescu .................. | G06F 8/75 |
| | | | | 715/762 |
| 2007/0061740 | A1* | 3/2007 | Marini ...................... | G06F 8/38 |
| | | | | 715/762 |
| 2007/0075916 | A1 | 4/2007 | Bump et al. | |
| 2007/0300167 | A1* | 12/2007 | Kadur ........................ | G06F 8/38 |
| | | | | 715/762 |
| 2008/0163078 | A1* | 7/2008 | Van Der Sanden .. | G06F 9/4443 |
| | | | | 715/762 |
| 2010/0218124 | A1* | 8/2010 | Aryanto .................... | G06F 8/36 |
| | | | | 715/762 |
| 2014/0115503 | A1* | 4/2014 | Mishra ...................... | G06F 8/38 |
| | | | | 715/760 |

OTHER PUBLICATIONS

"Written Opinion Issued in PCT Application No. PCT/US2015/023447", dated Jul. 4, 2016, 8 Pages.
"International Preliminary Report on Patentability Issued in PCT Application No. PCT/US2015/023447", dated Jul. 28, 2016, 9 Pages.
"International Search Report and Written Opinion Issued in PCT Application No. PCT/US2015/023447" dated Jul. 1, 2015, 13 Pages.
Berbecaru, et al., "Towards Simplifying PKI Implementation: Client-Server based Validation of Public Key Certificates", In 2nd IEEE International Symposium on Signal Processing and Information Technology, Dec. 18, 2002, pp. 277-282.
"Office Action Issued in European Patent Application No. 15716337.9", dated Jul. 5, 2018, 6 Pages.

* cited by examiner

USER INTERFACE CONTROL AND COMMUNICATION

CROSS REFERENCE TO RELATED APPLICATIONS

This application claims the benefit of U.S. Provisional Application Ser. No. 61/974,185, filed Apr. 2, 2014, which provisional patent application is incorporated herein by reference in its entirety.

BACKGROUND

A computing system often displays user interface elements called controls that the user may interact with to cause the computing system to execute respective operations, or through which the user may visualize underlying information. Often, user interface controls all operate within the same process and thus may share common shared memory. However, there are other instances in which user interface controls may not run in the same process, or even on the same machine. For instance, there might be a distributed application that has multiple extensions each offered by a different provider. The user interface controls may be offered by the different extensions that are not within the same sphere of trust.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein related to a user interface control that has different logic components for processing different role logic depending on a role that is played by the user interface control. The user interface control may also have a general function component that performs general functions that may be common across multiple user interface controls. For instance, the general function component may be provided by a template. Furthermore, much of the logic components may also be provided by the template, such that the functionality of the user interface element is data-driven, perhaps only involving defining the functionality of the logic components.

At least some embodiments described herein also may relate to a protocol for use in communicating between two user interface controls to establish a communications link. For instance, a first user interface control requests information from a second user interface control, which then obtains the requested information (e.g., by requesting the information from a user, or by soliciting some or all of the requested information from yet another user interface control recursively performing the same communication protocol). The second user interface control then provides the requested information to the first user interface control, and then awaits the validation of the requested information. In this scenario, the first user interface control might have a collector role in which the first user interface control collects information, and the second user interface control might have a provider role in which the second user interface control provides information. There may be multiple such communication links arranged in serial or hierarchical fashion. Accordingly, any given user interface control may perform both collector and provider roles.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
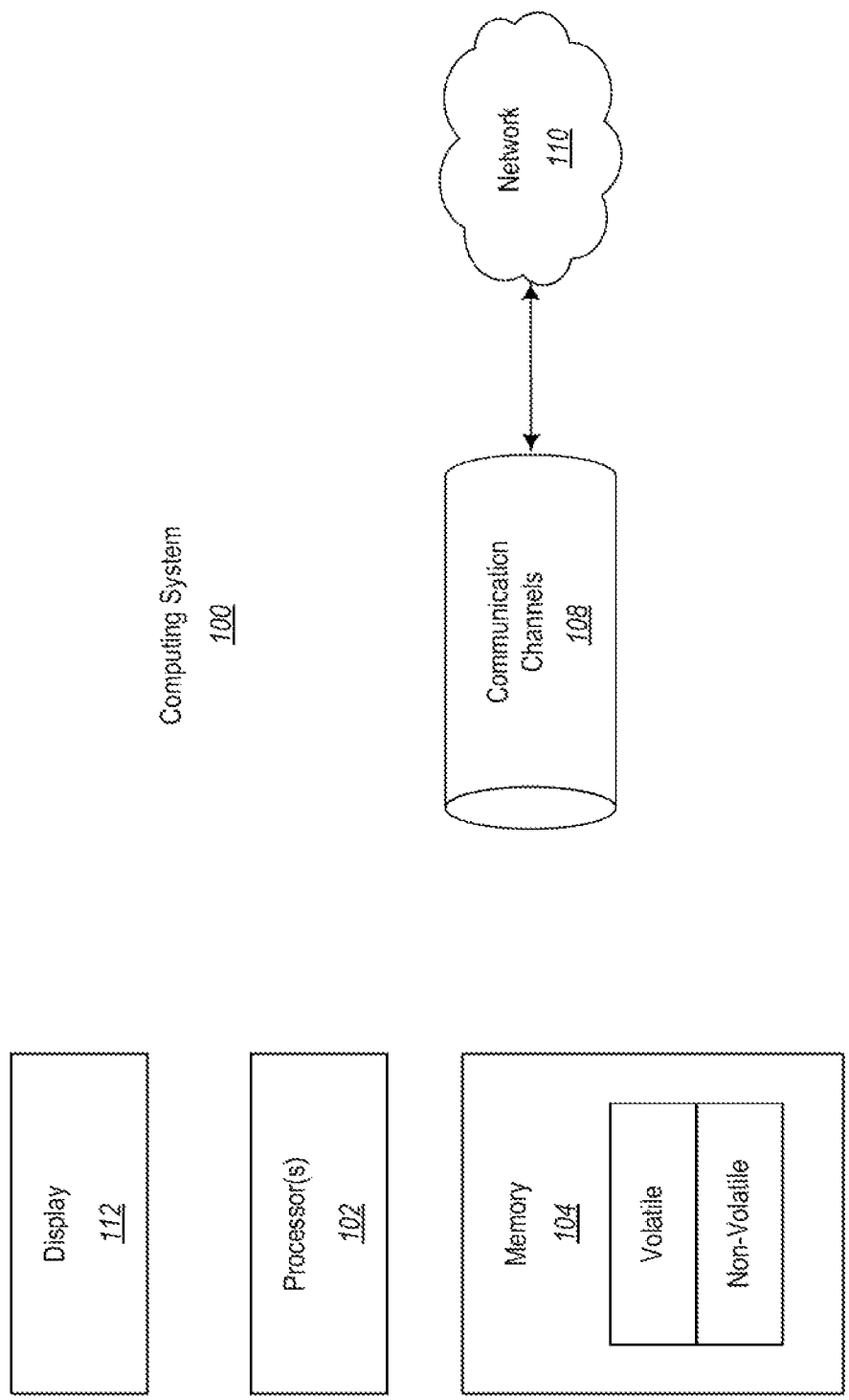
FIG. 1 illustrates an example computing system in which the principles described herein may be employed.

At least some embodiments described herein relate to a user interface control that has different logic components for processing different role logic depending on a role that is played by the user interface control. The user interface control may also have a general function component that performs general functions that may be common across multiple user interface controls. For instance, the general function component may be provided by a template. Furthermore, much of the logic components may also be provided by the template, such that the functionality of the user interface element is data-driven, perhaps only involving defining the functionality of the logic components in a declarative way.

At least some embodiments described herein also may relate to a protocol for use in communicating between two user interface controls to establish a communications link. For instance, a first user interface control requests information from a second user interface control, which then obtains the requested information (e.g., by requesting the information from a user, or by soliciting some or all of the requested information from yet another user interface control recursively performing the same communication protocol). The second user interface control then provides the requested information to the first user interface control, and then awaits the validation of the requested information. In this scenario, the first user interface control might have a collector role in which the first user interface control collects information, and the second user interface control might have a provider role in which the second user interface control provides information. There may be multiple such communication links arranged in serial or hierarchical fashion. Furthermore, the hierarchy can be composed with the components being loosely coupled, and reusable in multiple flow. Accordingly, any given user interface control may perform both collector and provider roles.

Some introductory discussion of a computing system will be described with respect to FIG. 1. Then, example user interfaces, methods and supporting architectures will be described with respect to subsequent figures.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "executable module" or "executable component" can refer to software objects, routines, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110. The computing system 100 also includes a display 112 for displaying user interfaces such as those described herein.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other tangible medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
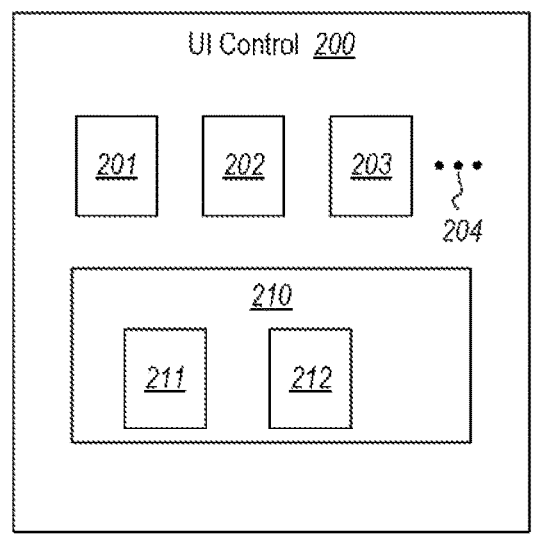
FIG. 2 illustrates a particular user interface control that may represent a software component that executes role logic components depending on a role occupied by the user interface control.

FIG. 2 illustrates a particular user interface control 200 that may represent a software component that may be implemented by, for instance, the computing system 100 of FIG. 1, and which may result in a corresponding user interface element to be displayed on the display 112.

The user interface control 200 is capable of implementing any one or more of several roles. For instance, the particular user interface control 200 includes three different role logic components 201, 202 and 203 for processing respective first, second, and third logic when the particular user interface control 200 has respective first, second and third roles. Specifically, the user interface control 200 has a first role logic component 201 for processing first role logic when the user interface control 200 has a first role; has a second role logic component 202 for processing second role logic when the user interface control 200 has a second role; and has a third role logic component 202 for processing third role logic when the user interface control 200 has a third role. The ellipses 204 represent that there may be any number of multiple roles implemented by the user interface control 200.

The user interface control 200 also includes a general function component 210 for performing general functions. Such general functions may include, for example, a communication function 211 for communicating with other user interface controls to receive data from or provide data to the other user interface controls. General functions might also include a role management function 212 for maintain a record of a current role or roles of the user interface control 200. In some embodiments, the user interface control may be created from a template of a set of available templates. Each template may include a corresponding general function component as well as much of the code for each of the role logic components. In fact, the construction of the user interface control from one of the user interface templates may essentially be data driven. For instance, the template may encompass user interface composition aspects and have a companion code artifact. Accordingly, the template may encapsulate visuals, interaction, and back-end behavior and logic.

Figure 3:
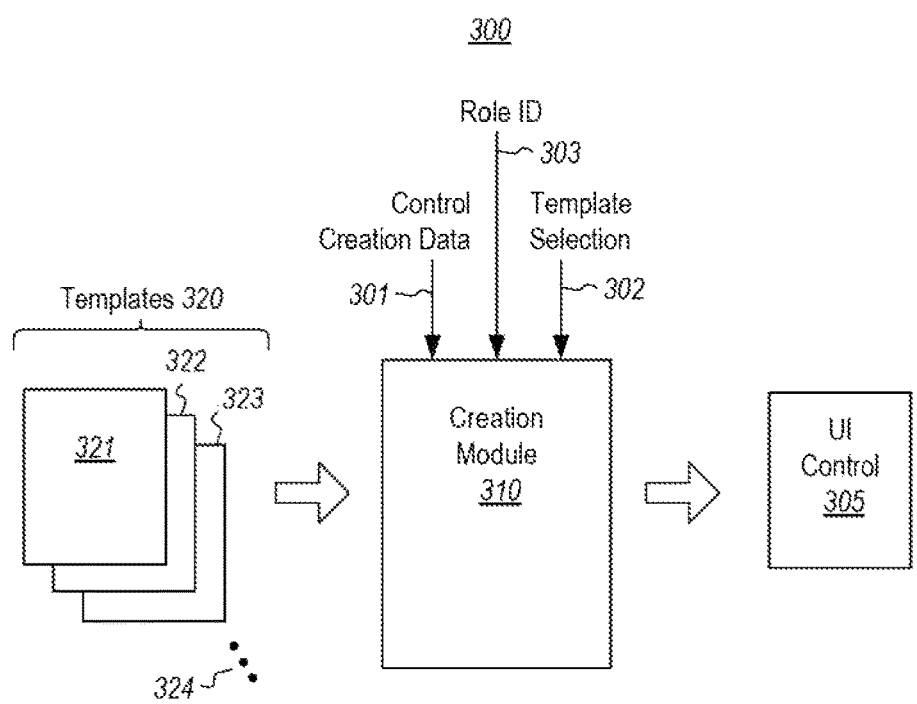
FIG. 3 illustrates a creation environment in which a creation module is fed control creation data, a template selector, and role identifier to thereby create a user interface control.

FIG. 3 illustrates a user interface control creation environment 300 in which a creation module 310 is fed control creation data 301, a template selection 302, and role identifier 303. The available templates 320 are illustrated as including three user interface control templates 321, 322 and 323, although the ellipses 324 represent that there may be any number of user interface control templates 320 made available for user interface control authors. For each role that the user interface control is to have a corresponding role logic component for, the author provides creation data 301 and a template selector 302. The creation module 310 then provides a user interface control 305 that has the appropriate role logic components (e.g., 201, 202, 203 and 204), and also has the correct general functions 210.

For instance, a wizard template may be used for role logic components that are to guide a user through multiple steps. The wizard template may come with all of the general code for performing steps of the task, and may just require the name of the step and a pointer to the next step. In this case, the template may be data-driven where the user provides the data about the steps (e.g., name, pointer destination, and so forth), and an optional controller logic to react to changes or completion of those steps. A forms template may be used for role logic components that are to display fillable fields. The user might just provide a template for the form layout, and appropriate data. A selector template may be used for role logic components that present a list of selections to the user, in which case, perhaps just the name of the selectable items are provided as data.

The created user interface control may be reusable in different contexts. In one embodiment, the operation of each instance of the same user interface control may differ depending on the input data and on the context in which the instance of the user interface control operates. Thus, once a user interface control is created, multiple instances of the same user interface control may be used in different processing flows.

In one embodiment, the first role implemented by the first role logic component 201 may be, for example, a collector role in which the user interface control collects data from one or more other interface controls. The second role implemented by the second role logic component 202 may be, for example, a provider role in which the particular user interface control provides data to one or more other user interface controls.

An example of a third role might be a provisioning role. For instance, the provisioning user interface control may have gathered data for a particular purpose. The provisioning role means that the user interface control may then use the gathered data in order to perform some other task such as, for example, the creation of a resource.

A communications link between two user interface controls may be implemented between first and second user interface controls when the first user interface control performs the first role of collector and the second user interface control performs the second role of provider. In such a communications link, the first user interface control collects data provided by the second user interface control, after the first user interface control requests such information. More regarding an example communication protocol for the communications link will be described below.

Figure 4:
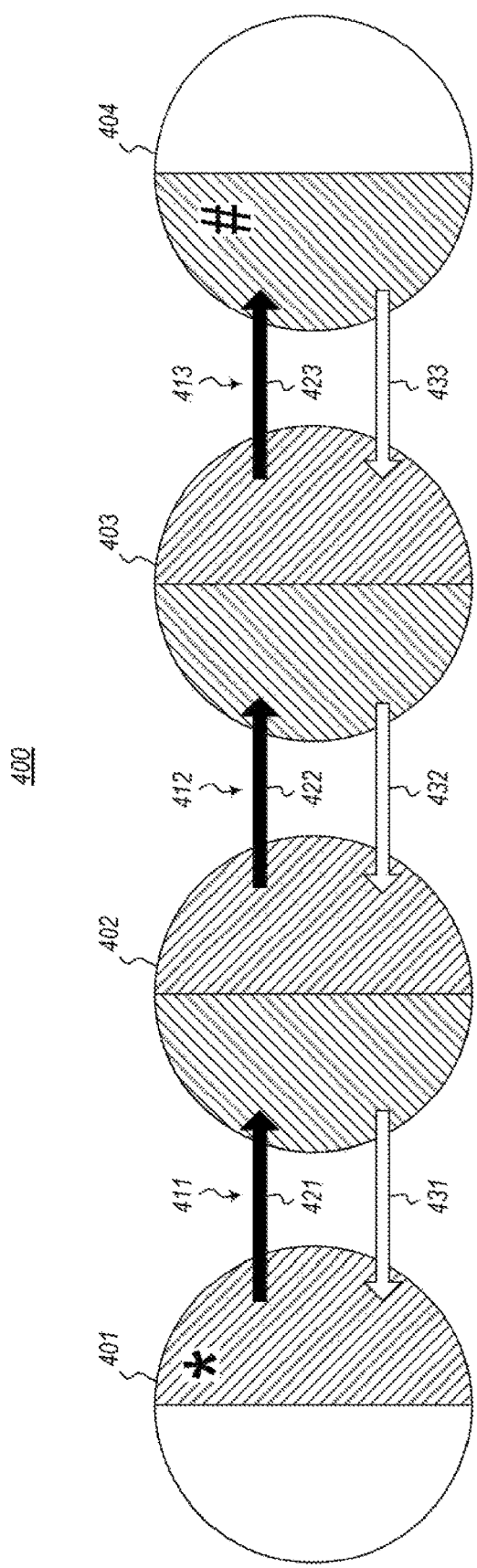
FIG. 4 abstractly illustrates an environment in which multiple user interface controls are coupled via multiple communication links.

FIG. 4 abstractly illustrates an environment 400 in which multiple user interface controls are coupled via multiple communication links. Each user interface control is represented by a corresponding circle. For instance, the environment 400 is illustrated as including four user interface controls 401 through 404. If the right half of the circle is filled with diagonal fill, this represents that the user interface control has the collector role. If the left half of the circle is filled with diagonal fill, this represents that the user interface control has the provider role. Accordingly, the user interface control 401 has the collector role, the user interface control 402 has both roles of collector and provider, the user interface control 403 has both roles of collector and provider, and the user interface control 404 has the role of provider.

A communication link 411 is established between the user interface control 401 (due to its collector role) and the user interface 402 (due to its provider role). Likewise, a communication link 412 is established between the user interface control 402 (due to its collector role) and the user interface 403 (due to its provider role). Finally, the communication link 413 is established between the user interface control 403 (due to its collector role) and the user interface 404 (due to its provider role).

In accordance with a protocol described hereinafter, the user interface control 401 submits an information request (as represented by arrow 421) to the user interface control 402, and receives the requested information (as represented by arrow 431) from the user interface control 402. As a collector, the user interface control 401 might also request information from a user. The user interface control 401 also has the provisioning role as represented by the asterisk. Accordingly, the user interface control 401 may thus use the requested information to perform some task, such as the creation of the resource. When the user interface control 401 submits the information request 421, the user interface control 401 may also cause the user interface control 402 to be instantiated, and submit input data to the user interface control 402.

In order to provide the requested information, the user interface control 402 submits an information request (as represented by arrow 422) to the user interface control 403, and receives the requested information (as represented by arrow 432) from the user interface control 403. The user interface control 402 may also prompt the user to input data. When the user interface control 402 submits the information request 422, the user interface control 402 may also cause the user interface control 403 to be instantiated, and submit input data to the user interface control 403.

In order to provide the requested information to the user interface control 402, the user interface control 403 submits yet another information request (as represented by arrow 423) to the user interface control 404, and receives the requested information (as represented by arrow 433) from the user interface control 404. The user interface control 403 may also prompt the user to input data. When the user interface control 403 submits the information request 423, the user interface control 403 may also cause the user interface control 404 to be instantiated, and submit input data to the user interface control 404.

In order to provide the requested information to the user interface control 403, the user interface control 404 may prompt a user to input data. Once that input data is provided, and the user confirms the input data, the requested information is provided back to the user interface control 403.

Figure 5:
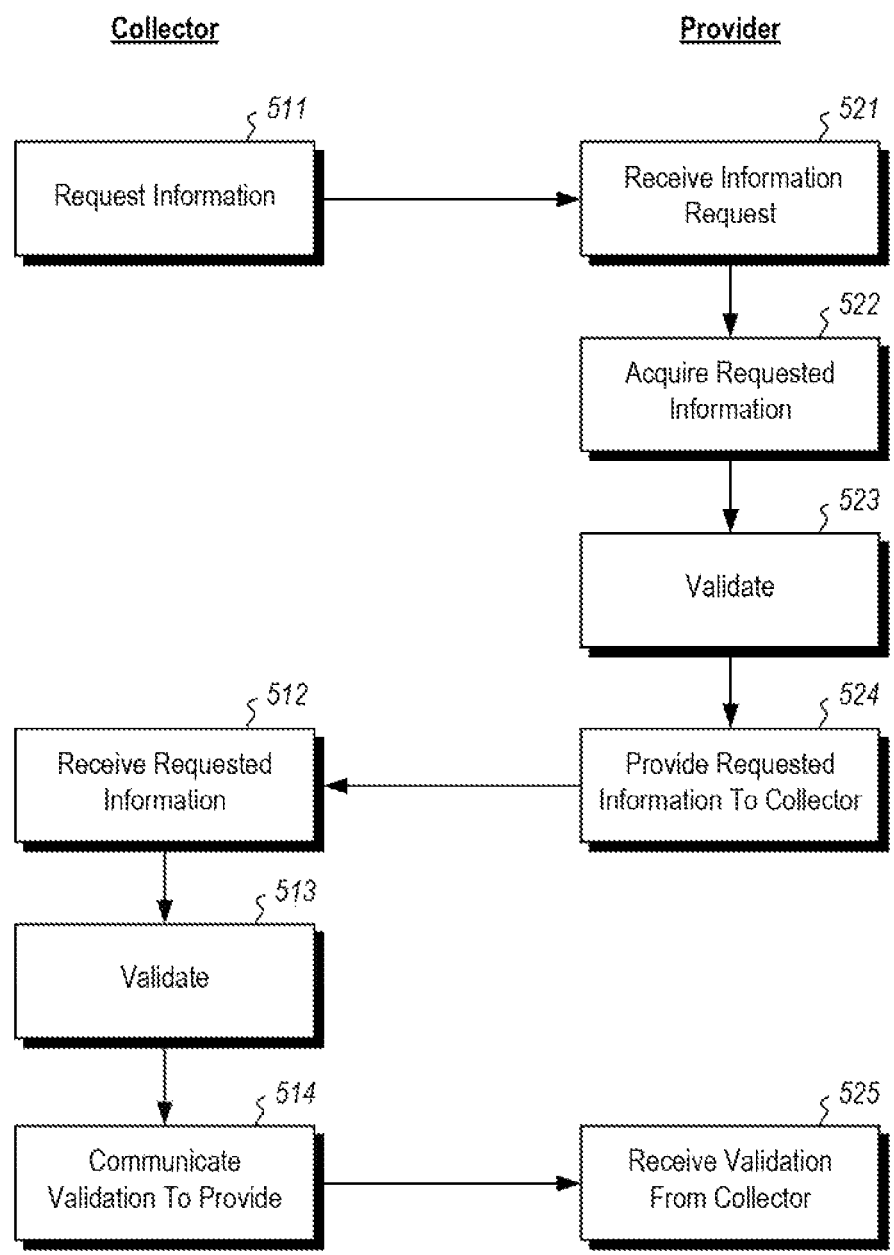
FIG. 5 illustrates a flowchart of a method of a first user interface control (in its capacity as a collector) to acquire data from a second user interface control (in its capacity as a provider)

An example communication protocol for each communication link will now be described with respect to FIGS. 5 and 6. FIG. 5 illustrates a flowchart of a method 500 of a first user interface control (in its capacity as a collector) to acquire data from a second user interface control (in its capacity as a provider). The communication protocol does not require that the user interface controls have shared memory. Accordingly, the user interface controls may be running in different processes, or even on different machines. Thus, the principles described herein may be effectively used in distributed application and/or in applications that have multiple sources providing user interface controls (as would be the case when an application allows extension authors to author extensions to the application).

The method 500 includes acts that are performed by the first user interface control in the communications link (as represented in the left column of FIG. 5 under the heading "Collector"). The method 500 also includes acts that are performed by the second user interface control in the communications link (as represented in the left column of FIG. 5 under the heading "Provider").

The collector first request information from a provider (act 511). As part of this process, the collector may also instantiate the user interface control that acts as provider, and cause the instantiated user interface control to take on the provider role. The collector may also provide input data to the provider, which input data likely is much smaller than the total amount of data available to the collector. The input data might also include metadata, where the input data can be used as defaults for some of the fields. FIG. 6 illustrates a link communication diagram 600 showing three nodes of communication including the collector, the provider, and the end user. The collector is shown as sending the initial data and context information to the provider via arrow 601. Accordingly, arrow 601 of FIG. 6 is an example of the act 511 of FIG. 5. FIG. 5 will be described with frequent reference to FIG. 6. The provider then receives the request to acquire information (act 521). This reception is also represented by arrow 601 in FIG. 6.

The provider then acquires the requested information (act 522). For instance, for some or all of the requested information, the provider may prompt a user for the requested information. Referring to FIG. 6, the provider seeks and gets inputs from the user (as represented by arrow 602). Alternatively, the provider may take upon itself the collector role and recursively initiate the method 500 again, this time as collector, using yet another user interface control.

As the provider gets the requested information, the provider performs validation of the requested information. Such validation is in the context of the provider. Referring to FIG. 6, the provider validates as represented by arrow 603. The commit communication 604 represents an intent by the user to submit the entered data. For instance, the user might select a "Submit" or "OK" or "Done" button in the user interface control that is acting as provider and is presenting to the user for purposes of receiving user input.

The provider then provides the requested information to the collector (act 524). At this point, the provider does yet treat the provided data as fully provided. Accordingly, the provider user interface control keeps displaying pending validation by the collector. The collector then receives the requested information (act 512). Acts 524 and 512 are collectively represented by arrow 605 in FIG. 6. Accordingly, the providing of the requested information is like a "try" in a try/commit programming model.

The collector then validates the requested information (act 513) in its own context, which in most cases may be broader than the context of the provider, because the collector asks the provider for only a portion of the data of the larger item being composed. If the collector does not successfully validate the requested information, the collector communicates one or more errors to the provider (represented by arrow 606 in FIG. 6). The provider may then attempt to get further information that are not subject to the errors, by perhaps prompting the user for different input, and perhaps by displaying the errors to the user (thereby letting the user perform corrective action such as provide additional inputs needed or changing some field values).

If the collector successfully validates the requested information, the collector informs the provider that the requested information is validated (act 514), whereupon the provider receives the communication (act 525). Acts 514 and 525 are represented by arrow 606, which is like a "commit" in a try/commit programming model.

Once the provider receives the validation from the collector, then the collector performs post-validation action (act 526). For instance, perhaps the user interface control that served as the provider closes. This closing of the provider user interface control is represented by the arrow 607 in FIG. 6. Because the user interface control acts as provider of data, the provider serves the collector. Accordingly, although the provider user interface control may perform its own validation of the requested information, the provider's primary imperative is to provide requested information that is acceptable to the collector. Accordingly, the provider does not satisfy itself that it has accomplished this task, until the collector user interface control validates the requested information.

Referring back to FIG. 4, note that the communication links form a series of user interface controls. However, any hierarchy of communication links may be formed. For instance, any given collector may enlist multiple providers to provide all of the information that the collector is interested in. There may even be many (dozens or even hundreds perhaps) of providers that are working to provide information requested by the collector).

Figures 6, 7:
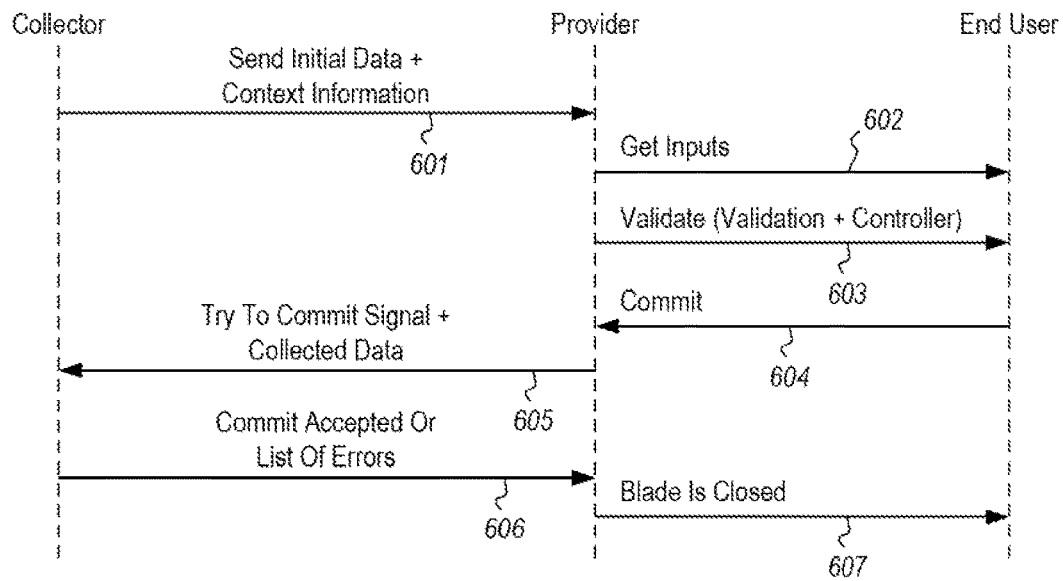
FIG. 6 illustrates a link communication diagram showing three nodes of communication including the collector, the provider, and the end user.
FIG. 7 illustrates a user interface that represents a user interface element that is supported by a user interface control that is acting in a provider role.

FIG. 7 illustrates a user interface 700 that represents a user interface element that is supported by a user interface control that is acting in a provider role. As previously mentioned, the provider role is to obtain requested information. Accordingly, the user interface 700 provides a form. Recall from FIG. 3, that the author of a given user interface control may specify a control template (in this case a form), the creation data (in this case, the name of the fields to be inserted, and potentially a layout template), and a corresponding role that is to be served by the resulting form (in this case, the provider role). The user would enter in the requested information into the user interface element 700, and select the OK button, to thereby cause the commit operation of arrow 604 in FIG. 6. Referring to FIG. 3, when the author of the user interface control 700 was using the control creator 310, the author may have provided an identifier for a forms template, and provided names for the fields (including in this case, "Server Name", "Server Admin Login", "Password" and "Confirm Password), and specified the provider role.

Figure 8:
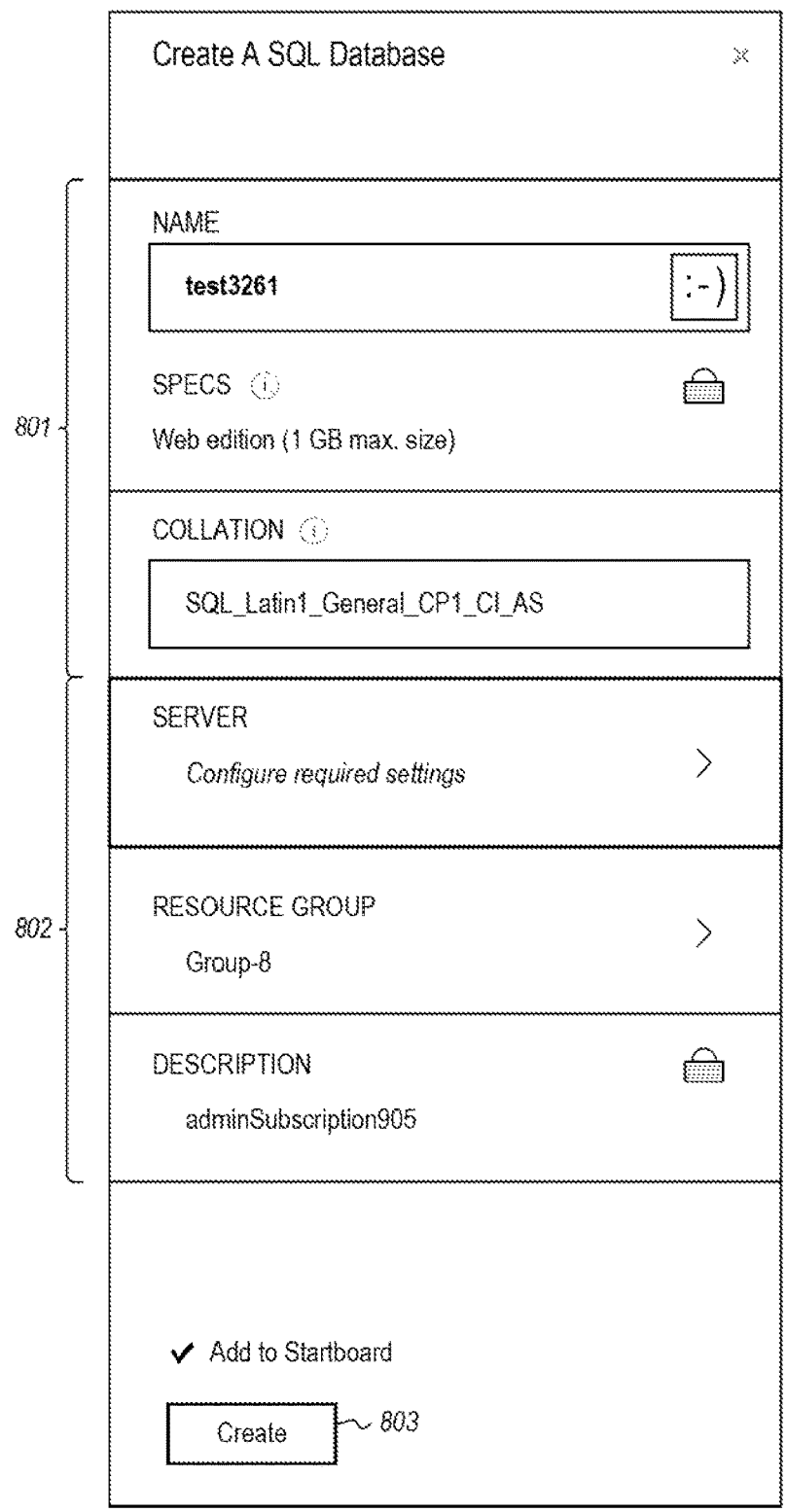
FIG. 8 illustrates a user interface that represents a user interface element that is supported by a user interface control that is acting in both the provider role and a collector role.

FIG. 8 illustrates a user interface 800 that represents a user interface element that is supported by a user interface control that is acting in both the provider role and a collector role. Also, in this case, the user interface control is also acting in the provisioner role to thereby create an item. For instance, the form 801 represents that portion of the user interface element that is serving as provider, by collecting creation input from the user. The wizard 802 represents that portion of the user interface element that is serving as collector. Presently, the server is in the process of being configured, meaning that the collector has requested information regarding the server from another provider, and is awaiting the requested information. The create button 803 may be enabled once all of the requested information has been collected. Referring to FIG. 3, when the author of the user interface control 800 was using the control creator 310, the author may have provided an identifier for a forms template, and provided names for the fields, and specified the provider role. Also, the author may have provided an identifier for a wizard template, and specified the names of the steps to be performed.

Accordingly, the principles described herein provide an effective mechanism for authoring user interface controls and allowing those controls to work with each other to obtain information needed to accomplish the tasks.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer-implemented method performed by one or more processors of a computing system which includes a memory containing computer-executable instructions which cause the one or more processors to perform the computer-implemented method, and wherein the computer-implemented method generates a user interface control capable of implementing any of several roles, the computer-implemented method comprising the following acts:

receiving control creation data and a template selected from a plurality of templates for a user interface control, the template providing a plurality of role logic components enabling each of a plurality of roles to be instantiated from the template, and the template also providing a general function component for performing one or more general functions that are common to each instance of the user interface control instantiated from the template;

receiving a first role identifier (roleID) corresponding to a first role;

creating a first instance of the user interface control corresponding to the first roleID, the first instance of the user interface control comprising logic corresponding to the first roleID and including the one or more general functions, the logic corresponding to the first roleID and the one or more general functions provided by the template;

creating a second instance of the user interface control corresponding to a second roleID corresponding to a second role, the second instance of the user interface control comprising logic corresponding to the second roleID and including the one or more general functions, the logic corresponding to the second roleID and the one or more general functions provided by the template; and wherein at least one of the general functions is executable by each of the first and second user interface controls, wherein the at least one of the general functions enables communication between the first and second user interface controls, and wherein the at least one of the general functions enables the first and second user interface controls to provide data to and to receive data from one another.

2. The computer-implemented method in accordance with claim 1, wherein the first role comprises a collector role which enables the first user interface control to collect data from the second user interface control.

3. The computer-implemented method in accordance with claim 2, wherein the second role comprises a provider role which enables the second user interface control to provide data to the first user interface control.

4. The computer-implemented method in accordance with claim 3, wherein the first user interface control performing the first role and the second user interface control performing the second role constitute a communications link in which the second user interface control provides data requested by the first user interface control to the first user interface control.

5. The computer-implemented method in accordance with claim 1, wherein the user interface control performs the first role and the second role at the same time with respect to different communications links.

6. The computer-implemented method in accordance with claim 1, wherein at least one of the general functions of the general function component is a role management function which, when executed, maintains a record of a current role or roles of a corresponding user interface control.

7. The computer-implemented method in accordance with claim 1, wherein one of the role logic components comprises a third role that provides, when executed, a provisioning role for the user interface control.

8. The computer-implemented method in accordance with claim 1, wherein the general function component is part of the template selection.

9. A computer program product comprising one or more computer-readable storage devices containing computer-executable instructions which cause one or more processors to perform a computer-implemented method for generating a user interface control capable of implementing any of several roles, and thereafter using multiple instances of the user interface control in different processing flows, and wherein the computer-implemented method comprises acts of:
  receiving control creation data and a template selection selected from a plurality of templates for a user interface control, the template providing a plurality of role logic components enabling each of a plurality of roles to be instantiated from the template, and the template also providing a general function component for performing one or more general functions that are common to each instance of the user interface control instantiated from the template;
  instantiating a first user interface control for use in a first processing flow by creating a first instance of the user interface control by executing a first role logic component that performs a first role;
  instantiating a second user interface control for use in a second processing flow by creating a second instance of the user interface control by executing a second role logic component that performs a second role different from the first role; and
  wherein at least one of the general functions is executable by each of the first and second user interface controls, wherein the at least one of the general functions enables communication between the first and second user interface controls, and wherein the at least one of the general functions enables the first and second interface controls to provide data to and to receive data from one another.

10. The computer program product in accordance with claim 9, wherein the first role comprises a collector role which enables the first user interface control to collect data from the second user interface control.

11. The computer program product in accordance with claim 10, wherein the second role comprises a provider role which enables the second user interface control to provide data to the first user interface control.

12. The computer program product in accordance with claim 11, wherein the first user interface control performing the first role and the second user interface control performing the second role constitute a communications link in which the second user interface control provides data requested by the first user interface control to the first user interface control.

13. The computer program product in accordance with claim 9, wherein the user interface control performs the first role and the second role at the same time with respect to different communications links.

14. The computer program product in accordance with claim 9, wherein at least one of the general functions of the general function component is a role management function which, when executed, maintains a record of a current role or roles of a corresponding user interface control.

15. The computer program product in accordance with claim 9 wherein one of the role logic components comprises a third role that provides, when executed, a provisioning role for the user interface control.

16. The computer program product in accordance with claim 9, wherein the general function component is part of the template selection.

17. A system for a computer architecture comprising:
  one or more processors;
  a display;
  a memory containing computer-executable instructions which, when executed by the one or more processors perform a computer-implemented method performed by one or more processors of a computing system which generates a user interface control at a display, the user interface control capable of implementing any of several roles, and thereafter using multiple instances of the user interface control in different processing flows, the computer-implemented method comprising:
    receiving control creation data and a template selected from a plurality of templates, the template providing a plurality of role logic components enabling each of a plurality of roles to be instantiated from the template, and the template also providing a general function component for performing one or more general functions that are common to each instance of the user interface control instantiated from the template;
    receiving a first role identifier (roleID) corresponding to a first role;
    creating a first instance of the user interface control corresponding to the first roleID, the first instance of the user interface control comprising logic corresponding to the first roleID and including the one or more general functions, the logic corresponding to the first roleID and the one or more general functions provided by the template;
    creating a second instance of the user interface control corresponding to a second roleID corresponding to a second role, the second instance of the user interface control comprising logic corresponding to the second roleID and including the one or more general functions, the logic corresponding to the second roleID and the one or more general functions provided by the template; and
    wherein at least one of the general functions is executable by each of the first and second user interface controls, wherein the at least one of the general functions enables communication between the first and second user interface controls, and wherein the at least one of the general functions enables the first and second interface controls to provide data to and to receive data from one another.

18. The system in accordance with claim 17, wherein the first role comprises a collector role which enables the first user interface control to collect data from the second user interface control.

19. The system in accordance with claim 18, wherein the second role comprises a provider role which enables the second user interface control to provide data to the first user interface control.

20. The system in accordance with claim 19, wherein the first user interface control performing the first role and the second user interface control performing the second role constitute a communications link in which the second user interface control provides data requested by the first user interface control to the first user interface control.

* * * * *